United States Patent [19]

Nakahama

[11] Patent Number: 4,527,441
[45] Date of Patent: Jul. 9, 1985

[54] SHIFTING APPARATUS FOR A PROPELLING UNIT FOR A VESSEL
[75] Inventor: Ryoji Nakahama, Iwata, Japan
[73] Assignees: Yamaha Hatsudoki Kabushiki Kaisha; Sanshin Kogyo Kabushiki Kaisha, both of Japan
[21] Appl. No.: 469,044
[22] Filed: Feb. 23, 1983
[30] Foreign Application Priority Data
Mar. 11, 1982 [JP] Japan .................................. 57-37292
[51] Int. Cl.³ .............................................. F16H 3/14
[52] U.S. Cl. ........................................ 74/378; 74/475; 192/48.91
[58] Field of Search ......................... 74/378, 323, 475; 192/48.91, 21, 89 QT, 96, 109 A
[56] References Cited
U.S. PATENT DOCUMENTS 2,623,490 12/1952 Kiekhaefer ............................ 74/378
2,642,829 6/1953 Kiekhaefer ............................ 74/378
2,718,792 9/1955 Kiekhaefer ............................ 74/378
2,756,855 7/1956 Kloss .................................. 74/378 X
2,924,124 2/1960 Froslie ................................ 74/475 X
3,731,554 5/1973 Renk ................................... 74/475 X
4,223,773 9/1980 Croisant et al. ..................... 192/48.91

FOREIGN PATENT DOCUMENTS 23323 7/1962 German Democratic Rep. ... 74/378

Primary Examiner—George H. Krizmanich
Assistant Examiner—Dirk Wright
Attorney, Agent, or Firm—Ernest A. Beutler

[57] ABSTRACT

A shifting arrangement for a propelling unit for a vessel embodying an improved and simplified unitary control rod for operating a clutching element of a reversing gear. The control rod is long and torsionally resilient and a detent cooperates with the lower end of the control rod for achieving a snap action gear engagement.

10 Claims, 6 Drawing Figures

SHIFTING APPARATUS FOR A PROPELLING UNIT FOR A VESSEL

BACKGROUND OF THE INVENTION

This invention relates to a shifting apparatus for the transmission of a marine outboard drive unit and more particularly to an improved and simplified shifting arrangement.

As is well known, outboard drive units normally embody a forward/reverse transmission in their lower unit. The transmission normally comprises a pair of bevel gears that are rotatably journalled on the propeller shaft and which are driven in opposite directions by means of the engine. A clutching mechanism is provided for selectively clutching one of these gears to the propeller shaft to drive the propeller shaft in either a forward or neutral direction. Shifting is controlled by means of a control lever or rod that extends through the upper unit and drive shaft housing and which is operated so as to select the appropriate gear. The control rod normally operates a plunger that is supported internally of the propeller shaft for shifting the clutch element. Because of the fairly large number of parts employed and the relatively compact construction of such transmission and shifting units, installation, assembly and repair are complicated. Furthermore, the use of separate parts gives rise to a difficulty in insuring that the parts are all properly assembled.

It is, therefore, a principal object of this invention to provide an improved, simplified shifting arrangement for an outboard drive.

It is another object of this invention to provide a simplified shift controlling mechanism for an outboard drive.

The clutching elements employed for clutching the respective driven bevel gear to the propeller shaft normally is of the dog type. By employing such positive clutching elements, it is essential to insure that the shift from neutral to either forward or reverse drive is made quickly so as to avoid clashing of the engaging clutch elements. It has been proposed to provide a detent mechanism internally of the clutch actuator that will resist shifting movement until a predetermined force is applied. It has also been proposed to employ a long torsionally resilient shift rod that will wind up when the detent is loaded and suddenly released its stored resilient energy to snap the clutch elements into engagement. Although such an arrangement provides extremely good clutch operation, the addition of the detent into the clutch actuating mechanism, particularly when confined within the propeller shaft, can further complicate the construction and render both assembly and servicing difficult as aforenoted.

It is, therefore, a still further object of this invention to provide an improved and simplified shifting arrangement for the transmission of an outboard drive that provides for snap engagement of the clutching members.

SUMMARY OF THE INVENTION

A first feature of this invention is adapted to be embodied in a shifting arrangement for a marine propelling unit or the like comprising an output shaft, a pair of oppositely rotating gears journalled on the output shaft and a clutch element rotatably coupled to the output shaft and axially movable relative to it for selective driving engagement with the gears for driving the output shaft in selected directions of rotation. A plunger is provided for axially moving the clutch element and an operating element is supported for reciprocation and is operatively connected to the plunger for operating the plunger to shift the clutch element. An elongated shift rod is employed for actuating the operating element. In accordance with this feature of the invention, the shift rod carries an integral actuating means for reciprocating the operating element upon rotation of the shift rod.

Another feature of this invention is adapted to be embodied in a shifting mechanism for coupling a driving mechanism to a driven mechanism comprising a pair of relatively movable, positive clutching elements each operatively connected for rotation with a respective one of the mechanisms. The clutching elements are relatively movable between an engaged position and a disengaged position and actuating means are provided for moving the clutching elements relative to each other between these positions. An operating element has a first end portion that is adapted to be moved by an operator for actuating the clutching elements, a second end portion cooperable with the clutching elements for their relative movement and a resilient intermediate portion. In accordance with this feature of the invention, detent means are engageable with a portion of the operating element contiguous to its second end portion for releasably restraining the second end portion in a neutral position. The intermediate portion is sufficiently resilient for relative rotation of the first and second end portions upon operation of the first end portion by an operator until a predetermined force required to release the detent means is exceeded for release of the resilient force stored in the intermediate portion on release of the detent means for providing a spring force for driving the clutching elements into engagement.

DETAILED DESCRIPTION OF THE PREFERRED EMBODIMENT

Figure 1:
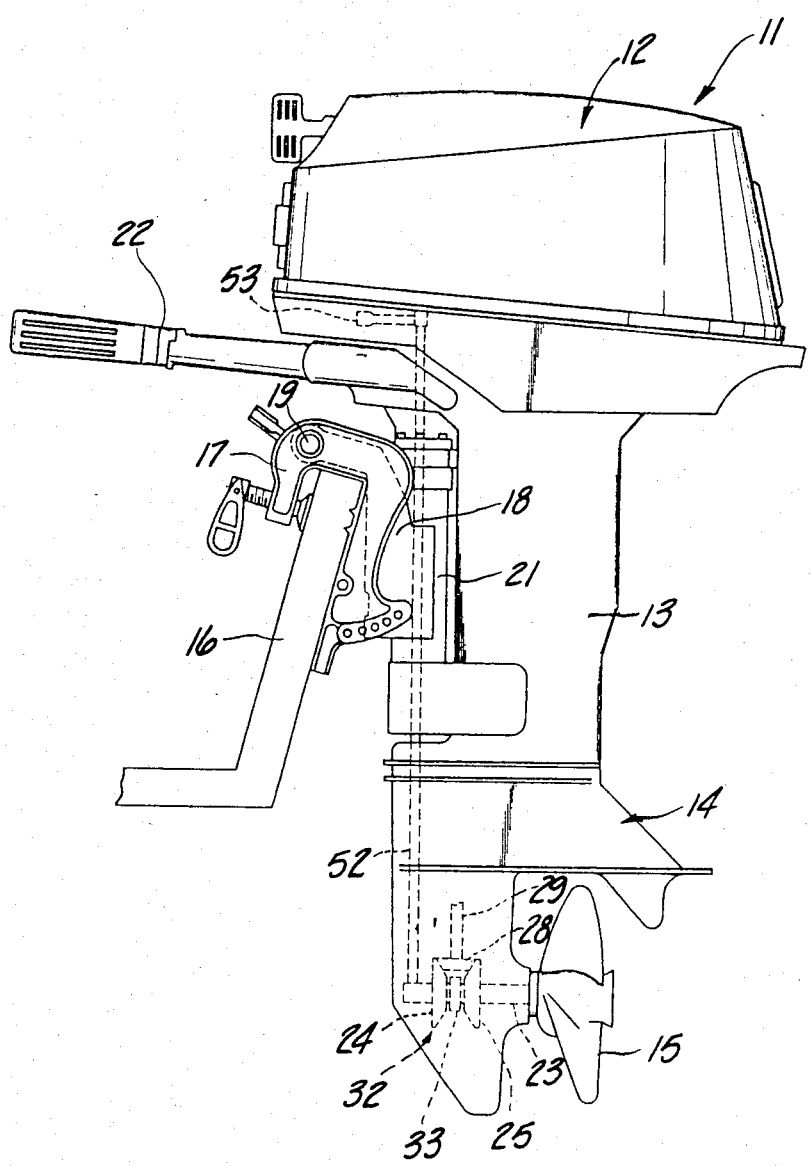
FIG. 1 is a side elevational view of an outboard motor having a shifting mechanism constructed in accordance with an embodiment of this invention.

Referring first to FIG. 1, an outboard motor constructed in accordance with this invention is identified generally by the reference numeral 11. The motor 11 includes a power head, indicated generally by the reference numeral 12, which comprises an internal combustion engine of any known type and a surrounding protective cowling. A drive shaft housing 13 depends from the power head 12 and carries a lower unit, indicated generally by the reference numeral 14. A drive shaft which is driven by the engine 12 extends through the drive shaft housing 13 and drives a propeller 15 of the lower unit in a manner to be described.

The motor 11 is adapted to be affixed to a transom of a boat, indicated at 16, by means of a clamping bracket assembly 17. The clamping bracket assembly 17 pivotally journals a swivel bracket 18 by means of a pivot pin 19 for pivotal movement of the outboard motor 11 about a horizontal tilting axis.

The swivel bracket 18 carries a bearing housing 21 that is adapted to rotatably journal a steering shaft that is supported within the drive shaft housing for steering of the motor 11 in a known manner by means of a tiller 22. The portion of the engine 11 thus far described is conventional and forms no part of the invention. For this reason, further details as to its construction have not been given.

Referring now primarily to FIGS. 2 through 6, the propeller 15 is affixed to a propeller shaft 23 that is journalled in the lower unit 14 in a manner to be described. A pair of bevel gears 24 and 25 are rotatably journalled on the propeller shaft 23 and have their hub portions suspended within the lower unit 14 by means of a thrust bearing 26 and a ball bearing 27. In this manner, the propeller shaft 25 is supported within the lower unit 14.

A driving bevel gear 28 is in mesh with the driven bevel gears 24 and 25 and is affixed to a lower end of a drive shaft 29 by means including a nut 31. Because of the arrangement of the bevel gears 28, 24 and 25, rotation of the drive shaft 29 will cause the driven gears 24 and 25 to rotate in opposite directions. The gear 24 comprises the forward driving gear while the gear 25 comprises the reverse driving gear.

A clutching mechanism, indicated generally by the reference numeral 32 is provided for selectively clutching the gears 24 or 25 to the propeller shaft 23. A clutch element 33 is positioned on the propeller shaft 23 between the gears 24 and 25. The clutch element 33 is splined by means of a splined connection 34 so that it will rotate with the propeller shaft 23 but is axially movable therealong. The clutch element 33 has oppositely facing clutch jaws 35 and 36 that are adapted to engage corresponding jaws 37 and 38 formed on the facing portions of the driven bevel gears 24, 25, respectively.

Figure 2:
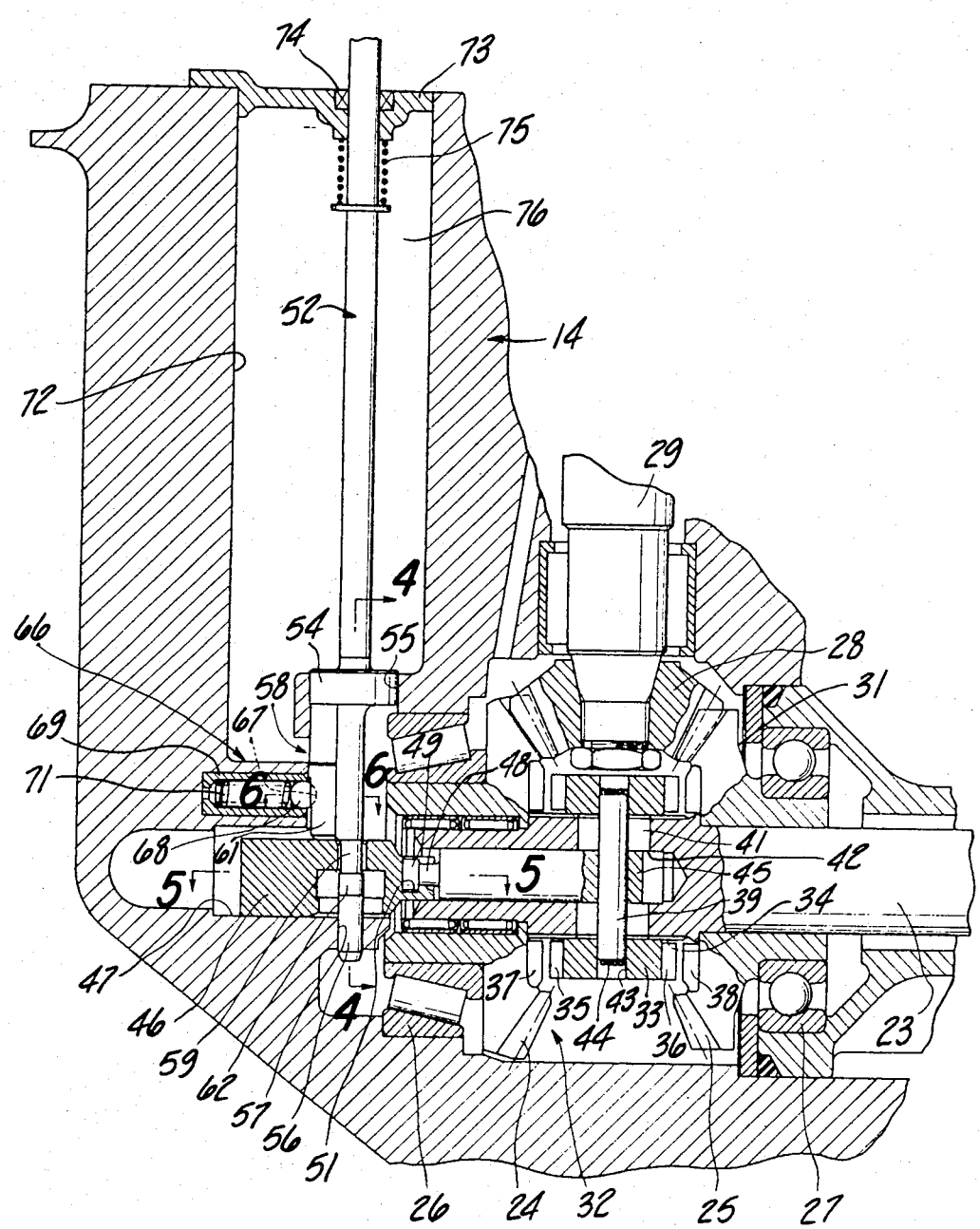
FIG. 2 is an enlarged, cross-sectional view showing the transmission and shifting mechanism.
Figure 3:
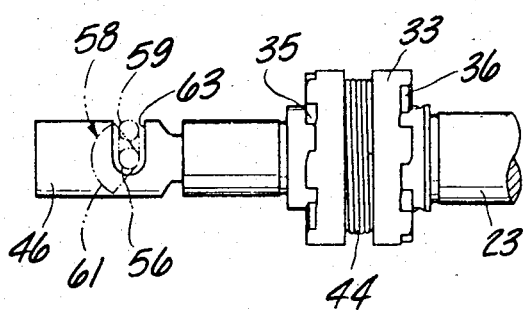
FIG. 3 is a top plan view showing the propeller shaft, clutching element and actuating arrangement for the clutching element.
Figure 5:
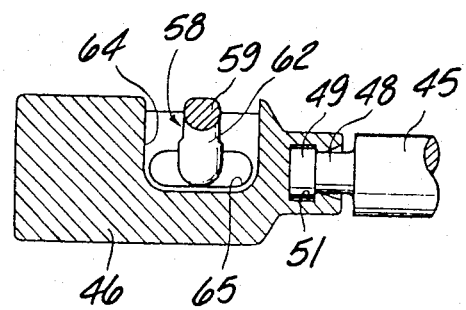
FIG. 5 is an enlarged, cross-sectional view taken along the line 5—5 of FIG. 2.
Figure 4:
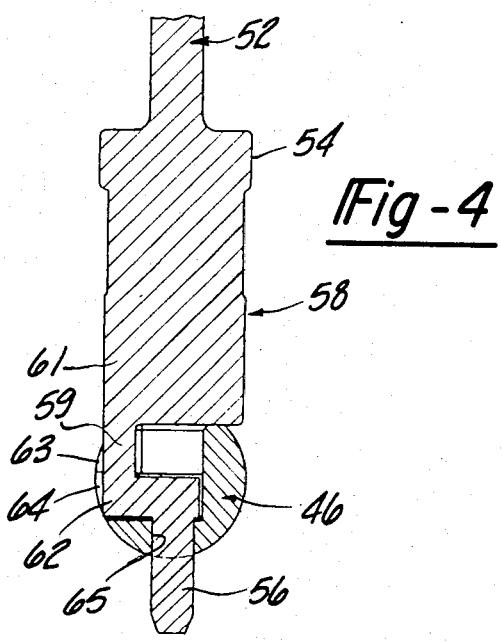
FIG. 4 is an enlarged, cross-sectional view taken along the line 4—4 of FIG. 2.
Figure 6:
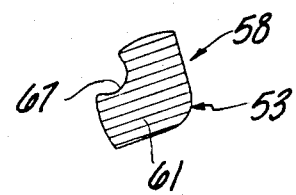
FIG. 6 is a partial, cross-sectional view taken generally along the line 6—6 of FIG. 2.

The clutch element 33 is moved axially between a neutral position as shown in FIG. 2 wherein neither of the driven gears 24, 25 will be coupled to the propeller shaft 23 and a forward driving position wherein the clutch elements 35, 37 will be engaged or a reverse drive condition wherein the clutch elements 36, 38 will be engaged.

The mechanism for shifting the clutch element 33 includes a pin 39 that extends through a bore in the clutch element 33 and which passes through a pair of axially extending grooves 41 formed in the propeller shaft 23 on opposite sides of a bore 42. A circumferential groove 43 is formed in the clutch member 33 in the area where the pin 39 extends. A coil spring 44 is wound around the ends of the pin 39 and received in the groove 43 for preventing dislocation of the pin 39.

The pin 39 is, in turn, axially affixed to a plunger member 45 that is slidably supported in the bore 42 of the propeller shaft 23. The plunger 45 is actuated by means of an actuating member 46 that is positioned within an opening 47 in the lower unit 14. For this purpose, the plunger 45 is axially affixed to the actuating member 46. To achieve this, the left hand end of the plunger 45 (as viewed in FIGS. 2 and 5) is provided with a reduced diameter neck portion 48 that terminates at a cylindrical head 49. The neck 48 and head 49 are detachably received in a corresponding recess 51 formed at one side of the actuating member 46. This interconnection interlocks the actuating member 46 and plunger 45 for simultaneous reciprocation. However, this connection permits rotation of the plunger 45 with respect to the actuating member 46 so that the plunger 45 can rotate with the propeller shaft 25 while the actuating member 46 is held against rotation.

An elongated control or shift rod, indicated generally by the reference numeral 52, extends upwardly from the lower unit 14 through the drive shaft housing 13 and terminates at an upper end portion that is juxtaposed to the underside of the power head 12 (FIG. 1). The control rod 52 has a shift lever 53 affixed to its upper end so that an operator may shift or rotate the control rod 52 to actuate the clutch element 43 in a manner now to be described.

The control rod 52 extends downwardly from the operating handle 53 through the drive shaft housing 13 and is formed with an integral enlarged cylindrical lower bearing surface 54. Between the upper end to which the handle 53 is affixed and the bearing portion 54, the control rod 52 has a relatively resilient intermediate section that is torsionally resilient for a reason to be described. The bearing section 54 is journalled in a complementary bore 55 of the lower unit 14. The control rod 52 has a lower end part 56 that is cylindrical in shape but smaller in diameter than the portion 54 but which is nevertheless integrally connected to it. The end portion 56 is journalled in a bore 57 formed at the lower end of the lower unit 14. Between the cylindrical bearing portions 54 and 56, the control rod 52 is provided with an actuating portion, indicated generally by the reference numeral 58.

The actuating portion 58 is also integral with the other components of the control rod 52 and includes a driving pin portion 59 that is disposed eccentrically to the axis of rotation of the control rod 52 and which is connected to the bearing portion 54 by means including an offset angular section 61. At its lower end, the pin portion 59 is integrally connected to the bearing portion 56 by means of an offset arm 62.

The control rod pin portion 59 is received in a narrow slot 63 that is formed on the upper side of the operating member 46 at approximately its midpoint. As may be seen in FIG. 3, the slot 63 opens through one side of the operating member 46. The area of the operating member 46 below the slot 63 is formed with an enlarged clearance recess 64 so as to clear the crank arm 62 during its rotary movement. Below the recess 64, the operating member 46 is provided with an elongated slot 65 that clears the bearing portion 56 of the control rod 52 so as to permit axial movement of the operating member 46 upon rotation of the control rod 52.

A detent assembly, indicated generally by the reference numeral 66, is provided for holding the control rod 52 and clutch mechanism 32 in its neutral position. The detent mechanism 66 also causes some torsional preload of the intermediate section of the control rod 52 during shifting operation so as to snap the clutch element 33 into engagement with the corresponding clutch elements of either the gears 24 or 25.

The detent mechanism 66 includes a detent recess 67 that is formed in the control rod section 61 at one side thereof corresponding to its neutral position. A ball detent 68 is contained within a cylindrical housing 69 which is received in a bore in the lower unit 14. A coil compression spring 71 normally urges the ball 68 into engagement with the recess 67 when the control rod 52 is in its neutral position. The force of the spring 71 is, however, such that upon the exertion of sufficient force to the upper end of the control rod 52 at the handle 53, the action of the spring can be overcome and the lower end of the control rod 52 and specifically its actuating portion 58 may rotate.

The control rod 52 extends upwardly from its actuating portion 58 through an enlarged opening 72 in the lower unit 14. A closure plate 73 closes this opening and is provided with a seal 74. A coil compression spring 75 engages the underside of the plate 73 and a snap ring 76 that is affixed to the control rod 52 so as to urge the control rod downwardly to a desired position relative to the lower unit 14.

OPERATION

The figures of the drawings show the transmission mechanism when the clutch element 33 is in its neutral position. Since neither of the clutch jaws 35 or 36 is engaged with the driven bevel gear jaws 37, 38, the drive shaft 29 will rotate and rotate the gears 24 and 25 but the propeller shaft 23 will not rotate. Thus, a neutral condition is obtained. The control rod 52 is maintained in this neutral position by the detent mechanism 66.

If it is desired to shift the transmission into a forward condition, the operator rotates the control rod lever 53 in the appropriate direction so as to cause the pin 59 to exert a force against the left hand side of the recess 63 of the actuating member 46. However, during initial exertion of this force, the detent mechanism 66 will resist rotation of the control rod actuating portion 58. Therefore, a torsional windup will occur in the intermediate portion of the control rod 52 until sufficient force is stored so as to overcome the action of the spring 71.

When the action of the detent mechanism 66 is overcome, the actuating portion 58 will rotate and the pin 59 will exert a force on the actuating member 46 to the left. This force will be transmitted to the plunger 45 and through the pin 39 to the clutch element 33. The clutch jaws 35 will then be snapped into engagement with the jaws 37 on the driven bevel gear 24 so as to effect a driving engagement between the drive shaft 29 and propeller shaft 23 in a forward direction.

The transmission may be returned from its forward drive condition to its neutral position by rotating the control rod 52 in the opposite direction. The detent mechanism 66 is not effective to restrain any disengagement of the clutch jaws 35, 37 and the return to neutral condition can be achieved easily. However, the detent mechanism 66 will reengage when the clutch element 33 is in its neutral position so as to prevent any inadvertent shift directly from forward to reverse.

If it is desired to shift the transmission to reverse, the control rod 52 is rotated in the opposite direction from that which it was rotated to achieve forward rotation of the propeller shaft 23. The detent mechanism 66 will again cause windup of the intermediate portion of the control rod 52 so as to effect snap engagement of the clutch jaws 36, 38 to achieve reverse drive.

It should be readily apparent that the disclosed construction minimizes the number of parts necessary to transmit rotary motion from the control rod 52 to the actuating element 46 since the operating portions of the control rod are formed integrally with it. In addition, the location of the detent mechanism permits snap action without unduly complicating the internal construction of the propeller shaft 23 and without further adding to the number of parts in the area of the clutch 32 per se.

The method of assembly will now be described. The lower unit 14 is assembled with the drive shaft 29 in place. The detent mechanism 66 and specifically the retainer 69, spring 71 and ball 68, which form a unitary assembly, are inserted through the open end of the lower unit at which the propeller 15 is to be mounted. The driven bevel gear 24 and bearing 26 are then installed as a unit through this open end. Once the gear 24 is in place, the gear 28 is affixed to the drive shaft 29 by means of the nut 31 using, of course, an appropriate wrench. A subassembly consisting of the actuating element 46, plunger 45, drive shaft 23, driven gear 25 and bearing 27 is then inserted into this open end. The control rod 52 is then inserted downwardly by threading its operating end 58 through the actuating member openings 63, 64 and 65. This can be easily accomplished due to the clearance in these openings even through the control rod 52 and its actuating portion 58 are a unitary assembly. Of course, it is not necessary that the control rod 52 and its actuating portion 58 be formed from the same element. That is, the actuating portion 58 may be a separate piece that is splined to the remaining portion of the control rod 52 so that these portions will form an integral assembly in use. When the term "integral" is used herein, it is intended to apply to an assembly that is one piece in operation even though it may be assemblied of separate pieces that are connected to each other for simultaneous operation. However, the invention does have some advantages in that it permits the use of a fully integrally one piece construction.

By providing a detent mechanism that operates on the control rod rather than on the plunger 45, it is possible to employ a larger assembly and more accurate control over the preload necessary to effect clutch engagement. Of course, certain facets of the invention may be used in conjunction with arrangements wherein the detent mechanism is positioned to operate directly upon the plunger 45 or, alternatively, upon the actuating element 46. Various other changes and modifications may be made without departing from the spirit and scope of the invention, as defined by the appended claims.

I claim:

1. In a shifting arrangement for a marine propelling unit or the like comprising an outer housing journalling an output shaft, a pair of oppositely rotating gears journalled on said output shaft, a clutch element rotatably coupled to said output shaft and axially movable relative thereto for selective driving engagement with said gears for driving said output shaft in a selected direction of rotation, a plunger for axially moving said clutch element, an operating element supported for reciprocation and operatively connected to said plunger for operating said plunger to shift said clutch element, and an elongated control rod, the improvement comprising said outer housing having an opening through which said control rod is inserted in an axial direction, said control rod having integral actuating means for reciprocating said operating element upon rotation of said control element, said integral actuating means being sized to pass through said outer housing opening.

2. In a shifting arrangement as set forth in claim 1 wherein the output shaft is supported for rotation within a lower unit housing, the control rod having a pair of integral bearing portions thereon journalled in said lower unit housing, the actuating means being positioned between said bearing portions.

3. In a shifting arrangement as set forth in claim 2 wherein the actuating means comprises an integral crank pin formed on the control rod and having an axis disposed eccentrically to the axis of rotation of the control rod.

4. In a shifting arrangement as set forth in claim 3 wherein the plunger is supported within a bore in the output shaft and is operatively connected to the operating element for simultaneous axial movement with said operating element and for rotation relative to said operating element, the control rod eccentric crank pin being disposed in a slot in said operating element for reciprocating said operating element upon rotation of said control rod.

5. In a shifting arrangement as set forth in claim 4 further including detent means cooperable with the control rod contiguous to the actuating means and being constructed to provide a predetermined resistance to rotation of said control rod, and further including a handle affixed to an end of said control rod spaced from the bearing portions, the intermediate portion of said control rod being sufficient resilient for relative rotation of said end portion relative to said actuating means upon operation of said end portion by an operator until the predetermined force required to release said detent means is exceeded for release of the resilient force stored in said intermediate portion upon release of said detent means for providing a spring force for driving said clutch into engagement with the selected of said driven gears.

6. In a shifting mechanism for coupling a driving mechanism to a driven mechanism comprising a pair of relatively movable positive clutching elements each operatively connected for rotation with a respective one of said mechanisms, said clutching elements being relatively movable between an engaged position and a disengaged position, and actuating means for moving said clutching elements relative to each other between their engaged and disengaged positions including an element having a first end portion adapted to be moved by an operator for actuating said clutching elements, a second end portion cooperable with said clutching elements for their relative movement and a resilient intermediate portion, the improvement comprising detent means engageable with a portion of said element contiguous to said second end portion for releasably restraining said second end portion in a neutral position, said intermediate portion being sufficiently resilient for relative rotation of said first and second end portions upon operation of said first end portion by an operator until the predetermined force required to release said detent means is exceeded for release of the resilient force stored in said intermediate portion upon release of said detent means for providing a spring force for driving said clutching elements into engagement.

7. A shifting mechanism as set forth in claim 6 further including a third positive clutching element, said second clutching element being selectively movable into engagement with either of said first or said third clutching elements, said actuating means being operative to move said second clutching element into clutching engagement with either of said first and third clutching elements, said detent means being operative to hold said second end portion in a neutral disengaged position.

8. A shifting mechanism as set forth in claim 7 wherein the second clutching element is supported for axial movement and is disposed between the first and third clutching elements.

9. A shifting mechanism as set forth in claim 8 wherein the second clutching element is slidably supported upon an output shaft which comprises the driven mechanism and is keyed for rotation with said output shaft.

10. A shifting mechanism as set forth in claim 9 wherein the actuating means comprises a torsion bar.

* * * * *